(12) United States Patent
Takahashi et al.

(10) Patent No.: US 8,748,820 B2
(45) Date of Patent: Jun. 10, 2014

(54) PROJECTION TYPE DISPLAY SYSTEM HAVING POSITION DETECTION FUNCTION

(75) Inventors: Masaki Takahashi, Chino (JP); Kogo Endo, Chino (JP)

(73) Assignee: Seiko Epson Corporation (JP)

( * ) Notice: Subject to any disclaimer, the term of this patent is extended or adjusted under 35 U.S.C. 154(b) by 417 days.

(21) Appl. No.: 12/894,637

(22) Filed: Sep. 30, 2010

(65) Prior Publication Data

US 2011/0080575 A1 Apr. 7, 2011

(30) Foreign Application Priority Data

Oct. 7, 2009 (JP) .................................. 2009-233069

(51) Int. Cl.
*G01J 1/00* (2006.01)

(52) U.S. Cl.
USPC ...................................................... 250/336.1

(58) Field of Classification Search
USPC ......................................... 250/336.1; 356/51
See application file for complete search history.

(56) References Cited

U.S. PATENT DOCUMENTS

| 6,144,366 | A | 11/2000 | Numazaki et al. | |
|---|---|---|---|---|
| 2001/0026268 | A1 | 10/2001 | Ito | |
| 2001/0052985 | A1* | 12/2001 | Ono | 356/614 |
| 2002/0061217 | A1 | 5/2002 | Hillman et al. | |
| 2004/0108990 | A1 | 6/2004 | Lieberman et al. | |
| 2004/0217267 | A1 | 11/2004 | Reime | |
| 2008/0055261 | A1 | 3/2008 | Cernasov | |
| 2008/0088593 | A1 | 4/2008 | Smoot | |

FOREIGN PATENT DOCUMENTS

| DE | 102004 014 245 A1 | 10/2005 |
|---|---|---|
| JP | 2001-142643 | 5/2001 |
| JP | 2007-048135 A | 2/2007 |
| JP | 2009-064375 A | 3/2009 |

OTHER PUBLICATIONS

Wilson, Andrew D. "PlayAnywhere: a compact interactive tabletop projection-vision system." Proceedings of the 18th annual ACM symposium on User interface software and technology. Acm, 2005.*
Data Sheet for OTLH-0070-IR, Opto Technology, Inc., 2004.*

* cited by examiner

*Primary Examiner* — David Porta
*Assistant Examiner* — Edwin Gunberg
(74) *Attorney, Agent, or Firm* — Harness, Dickey & Pierce, P.L.C.

(57) ABSTRACT

A projection type display system having a position detection function which projects an image from an image projection device and optically detects a position of a target object between a surface on which the image is projected and the image projection device, includes: a position detection light source unit disposed on the image projection device to emit position detection light toward the target object; a light detector which detects the position detection light reflected by the target object in a detection area; and a position detection unit which detects the position of the target object based on a light reception result obtained by the light detector, wherein an intensity distribution of the position detection light is produced in an area to which the position detection light is supplied.

20 Claims, 10 Drawing Sheets

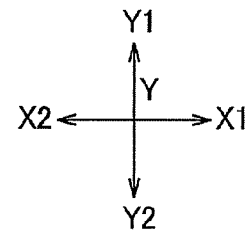
FIG. 5A  X COORDINATE DETECTION
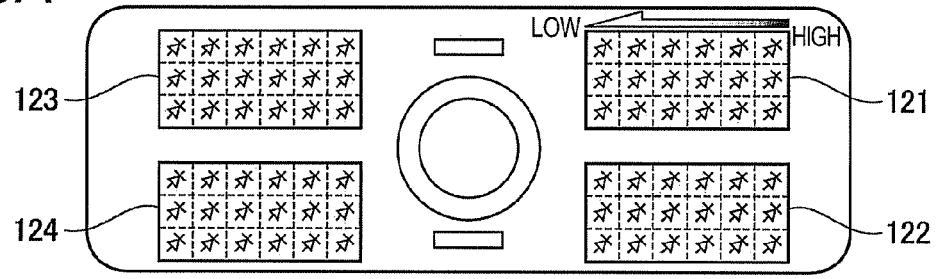
FIG. 5B  X COORDINATE DETECTION
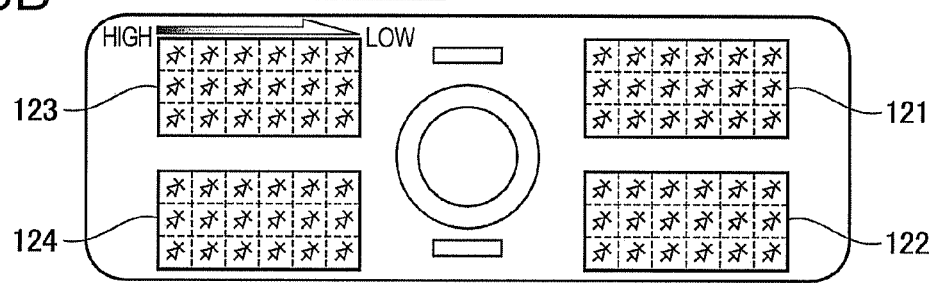
FIG. 5C  Y COORDINATE DETECTION
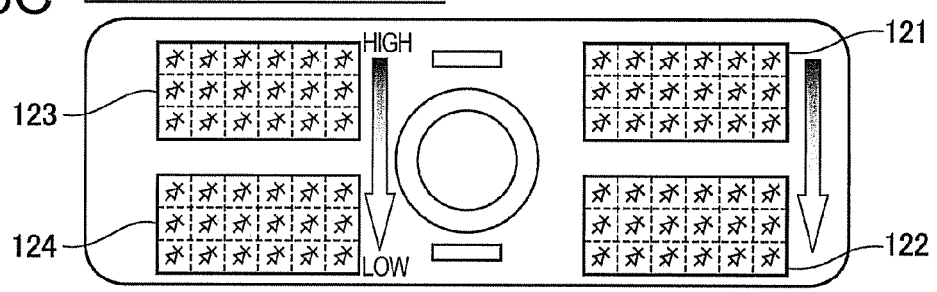
FIG. 5D  Y COORDINATE DETECTION
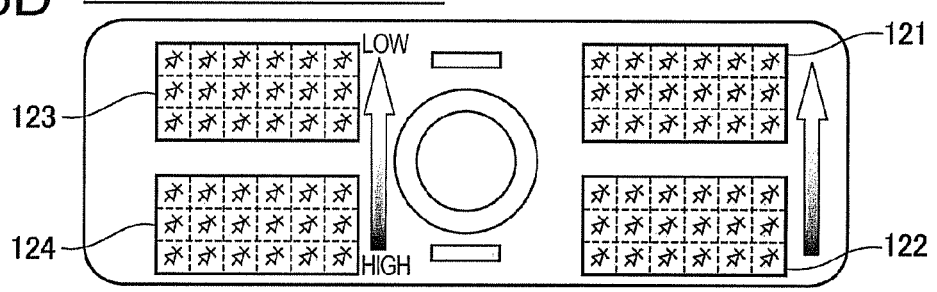

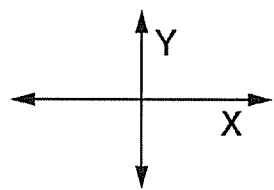

PROJECTION TYPE DISPLAY SYSTEM HAVING POSITION DETECTION FUNCTION

BACKGROUND

1. Technical Field

The present invention relates to a projection type display system having a position detection function capable of projecting an image and optically detecting a position of a target object located within a detection area determined on the projection side of the image.

2. Related Art

Recently, an electronic device such as a cellular phone, a car navigation system, a personal computer, a ticket machine, and a bank terminal unit includes a display system having a position detection function as a unit which has a touch panel on a front surface of an image producing device such as a liquid crystal device. According to this display system having the position detection function, information is inputted while referring to an image displayed on the image producing device. The touch panel is constituted by a position detection device for detecting a position of a target object within a detection area (for example, see JP-A-2001-142643, FIG. 6).

The position detection device disclosed in JP-A-2001-142643 is an optical type device which has a detection area on the image display surface side of a direct viewing type display system and includes a plurality of light emitting diodes and a plurality of photo-transistors on one side and the other side of the detection area, respectively. According to this position detection device, a position of a target object entering the detection area and blocking light can be detected by specifying the photo-transistor to which supply of the light is blocked by the target object.

The present inventor intends to propose a novel display system, i.e., a projection type display system having a position detection function which determines a detection area on the image projection side such as in the vicinity of a screen and detects a position of a target object located within the detection area. When the structure disclosed in JP-A-2001-142643 is applied to the novel projection type display system having the position detection function, a number of light emitting diodes and photo-transistors are required to be disposed around the detection area. This type of projection type display system having the position detection function is difficult to be put to practical use.

SUMMARY

An advantage of some aspects of the invention is to provide a projection type display system having a position detection function capable of detecting a position of a target object without using a number of light emitting elements and light receiving elements around a detection area.

An aspect of the invention is directed to a projection type display system having a position detection function which projects an image from an image projection device and optically detects a position of a target object between a surface on which the image is projected and the image projection device including: a position detection light source unit disposed on the image projection device to emit position detection light toward the target object; a light detector which detects the position detection light reflected by the target object in a detection area; and a position detection unit which detects the position of the target object based on a light reception result obtained by the light detector. An intensity distribution of the position detection light is produced in an area to which the position detection light is supplied.

According to the projection type display system having the position detection function of this aspect of the invention, the position detection light source unit for emitting the position detection light toward the target object positioned between the surface on which the image is projected and the image projection device is provided, and the position detection light reflected by the target object in the detection area is detected by the light detector. Since the position detection light emitted from the position detection light source unit produces the intensity distribution in the detection area, the position detection unit can detect the position of the target object based on the light reception result obtained from the light detector by determining the relationship between the position and the intensity of the position detection light beforehand. Moreover, the position detection light source unit provided on the image projection device emits the position detection light from the image projection device. Thus, the necessity of providing a number of the light emitting elements around the detection area is eliminated.

In this aspect of the invention, it is preferable that the position detection light is infrared light. According to this structure, the position detection light does not become an obstacle to image display.

In this aspect of the invention, it is preferable that the intensity of the position detection light in the intensity distribution monotonously decreases or monotonously increases from one side to the other side in the area to which the position detection light is supplied. It is particularly preferable that the intensity of the position detection light in the intensity distribution linearly changes in the area to which the position detection light is supplied. According to this structure, the position of the target object can be accurately detected by a relatively simple process.

In this aspect of the invention, it is preferable that the position detection light source unit emits the position detection light from a front surface of the image projection device where a projection lens for projecting the image is disposed. That is, since the light for image display and the position detection light are emitted in the same direction, it is preferable that the light for image display and the position detection light are emitted from the front surface of the image projection device. According to this structure, the emission directions of the light for image display and the position detection light can be adjusted by controlling the direction of the front surface of the image projection device.

In this aspect of the invention, it is preferable that the position detection light source unit, the light detector, and the position detection unit are all disposed on the image projection device. According to this structure, the pixels necessary for the position detection are provided on the image projection device. Thus, the portability improves, and the optical axis direction of the light detector is adjustable by controlling the direction of the image projection device.

In this aspect of the invention, it is preferable that the light detector is disposed on the front surface of the image projection device. In this case, the light for image display and the position detection light are emitted in the same direction, and the light detector is disposed in this direction. Thus, in the structure which has the light detector on the front surface of the image projection device, the emission directions of the light for image display and the position detection light, and the direction of the optical axis center of the light detector can be adjusted only by controlling the direction of the front surface of the image projection device.

In this aspect of the invention, it is preferable that, when two directions crossing a projection direction of the image are X axis direction and Y axis direction, the position detection light source unit produces an intensity distribution for X coordinate detection in which an intensity changes in the X axis direction and an intensity distribution for Y coordinate detection in which an intensity changes in the Y axis direction as intensity distributions of the position detection light. According to this structure, the X-Y coordinates within the detection area can be detected.

In this aspect of the invention, it is preferable that the position detection light source unit produces a first intensity distribution for X coordinate detection in which a light amount decreases from the one side to the other side in the X axis direction and a second intensity distribution for X coordinate detection in which an intensity changes in the direction opposite to the direction of the first intensity distribution for X coordinate detection as the intensity distribution for X coordinate detection, and produces a first intensity distribution for Y coordinate detection in which a light amount decreases from the one side to the other side in the Y axis direction and a second intensity distribution for Y coordinate detection in which an intensity changes in the direction opposite to the direction of the first intensity distribution for Y coordinate detection as the intensity distribution for Y coordinate detection. According to this structure, the X coordinate can be accurately detected by using the first intensity distribution for X coordinate detection and the second intensity distribution for X coordinate detection. Also, the Y coordinate can be accurately detected by using the first intensity distribution for Y coordinate detection and the second intensity distribution for Y coordinate detection.

In this aspect of the invention, it is preferable that the position detection light source unit has a plurality of light emitting elements for emitting the position detection light, controls the balance of the emission light amount from the light emitting elements, and produces the intensity distribution of the position detection light. According to this structure, the intensity distribution of the position detection light can be formed in various directions only by using a relatively small number of the light emitting elements.

In this aspect of the invention, it is preferable that, when two directions crossing a projection direction of the image are X axis direction and Y axis direction, plural rows of the light emitting elements are disposed in both the X axis direction and the Y axis direction. According to this structure, the intensity distribution for X coordinate detection and the intensity distribution for Y coordinate detection can be easily produced.

In this aspect of the invention, the light emitting elements may be light emitting elements each of which has the wavelength peak in the same wavelength range.

In this aspect of the invention, it is preferable that the position detection light source unit has first light emitting elements for emitting first infrared light having the wavelength peak in a first wavelength range, and second light emitting elements for emitting second infrared light having the wavelength peak in a second wavelength range different from the first wavelength range as the plural light emitting elements. In this case, a first light detector having the sensitivity peak in the first wavelength range and a second light detector having the sensitivity peak in the second wavelength range are provided as the light detector. According to this structure, the intensity distributions in different directions are simultaneously produced by the first light emitting elements and the second light emitting elements, and the respective lights are received by the first light detector and the second light detector. Thus, the time required for the coordinate detection can be shortened.

BRIEF DESCRIPTION OF THE DRAWINGS

The invention will be described with reference to the accompanying drawings, wherein like numbers reference like elements.

FIGS. 5A through 5D illustrate controls over light emitting elements of the projection type display system having the position detection function according to the first embodiment of the invention.

DESCRIPTION OF EXEMPLARY EMBODIMENTS

Exemplary embodiments according to the invention are hereinafter described in detail with reference to the appended drawings. In the following explanation, X axis, Y axis, and Z axis crossing each other are used, and an image is projected in a direction along the Z axis direction. In the respective figures referred to in the embodiments, the X axis direction corresponds to the horizontal direction, and the Y axis direction corresponds to the vertical direction. In addition, in the respective figures referred to in the embodiments, the X axis direction has X1 side and X2 side as one side and the other side, respectively, and the Y axis direction has Y1 side and Y2 side as one side and the other side, respectively.

First Embodiment

Figure 1A:
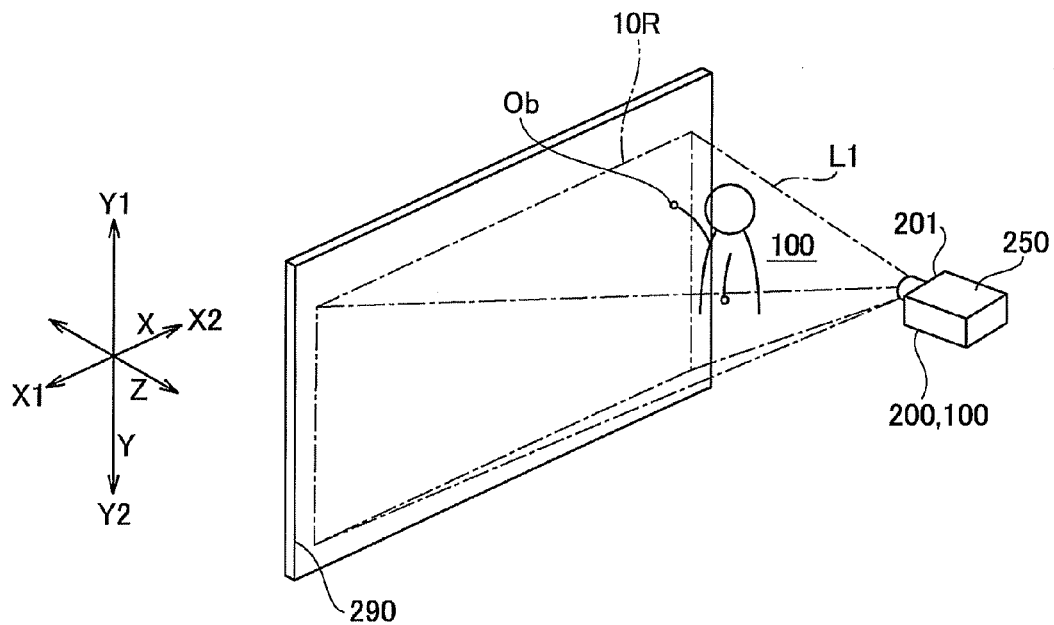
FIGS. 1A and 1B schematically illustrate the structure of a projection type display system having a position detection function according to a first embodiment of the invention.
Figure 1B:
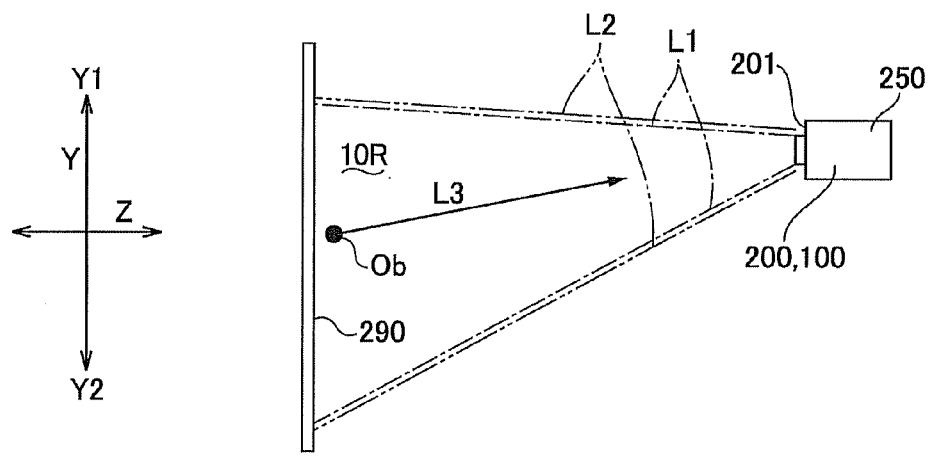
Figure 2A:
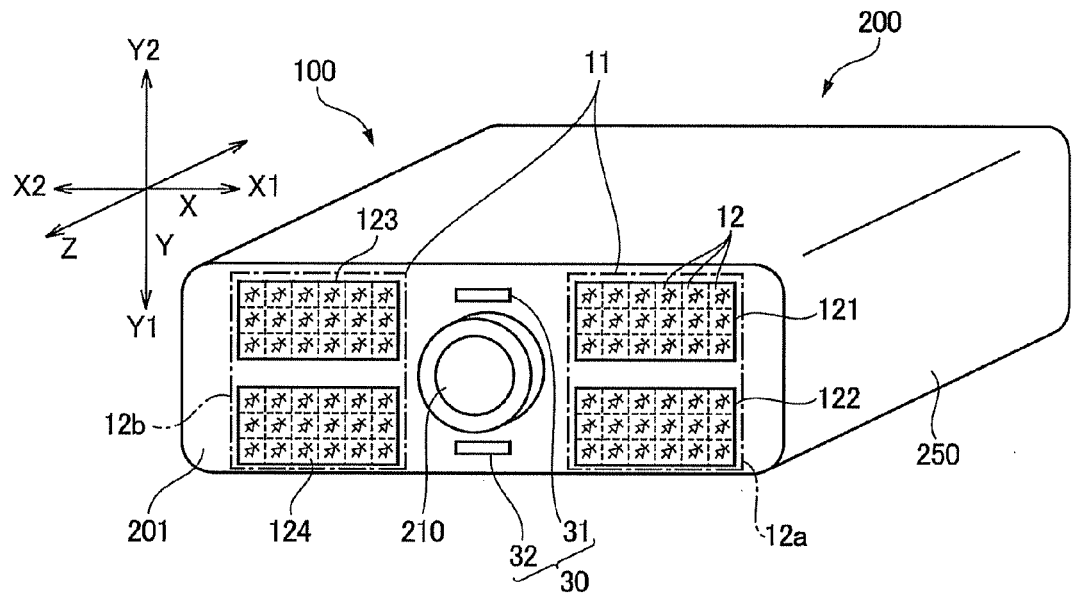
FIGS. 2A and 2B illustrate an image projection device included in the projection type display system having the position detection function according to the first embodiment of the invention.
Figure 2B:
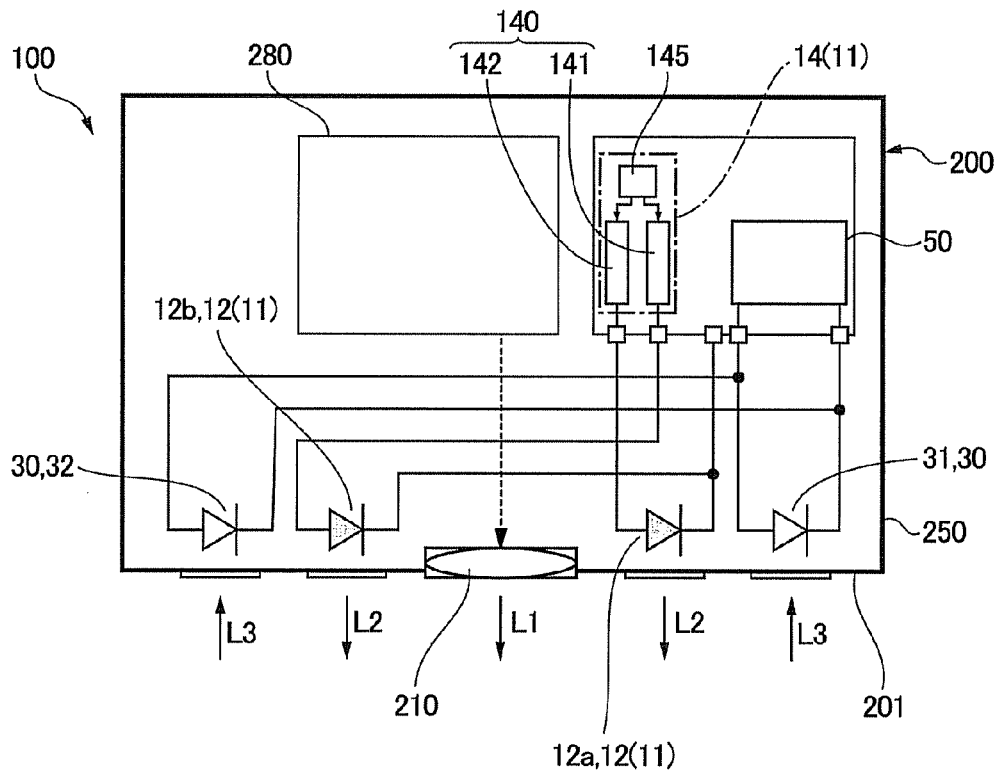

General Structure of Projection Type Display System Having Position Detection Function FIGS. 1A and 1B schematically illustrate the structure of a projection type display system having a position detection function according to a first embodiment, wherein: FIG. 1A schematically shows the main part of the projection type display system having the position detection function as diagonally viewed from above; and FIG. 1B schematically shows the main part of the projection type display system having the position detection function as viewed in the horizontal direction. FIGS. 2A and 2B illustrate an image projection device included in the projection type display system having the position detection function according to the first embodiment of the invention, wherein: FIG. 2A shows the image projection device as viewed from the front surface; and FIG. 2B shows the electric structure and the like of the projection type display system having the position detection function.

A projection type display system having a position detection function 100 shown in FIGS. 1A and 1B and FIGS. 2A and 2B includes an image projection device 200 called a liquid crystal projector or a digital micromirror device. This image projection device 200 projects enlarged image display light L1 from a projection lens 210 (see FIG. 2A) provided on a front surface 201 of a housing 250 toward a screen 290. Thus, the image projection device 200 has an optical device 260 provided within the housing 250 to produce color image display light and emit the color image light through the projection lens 210. In this embodiment, the screen 290 has a quadrangular shape elongated in the horizontal direction.

As will be described later, the projection type display system having the position detection function 100 in this embodiment has a function of optically detecting a position of a target object Ob within a detection area 10R determined before the screen 290 as the image projection side.

For providing this position detection function, the projection type display system having the position detection function 100 in this embodiment has a position detection light source unit 11 which emits position detection light L2 constituted by infrared light toward the detection area 10R to produce an intensity distribution of the position detection light L2 in the detection area 10R. The projection type display system having the position detection function 100 further includes a light detector 30 for detecting position detection light L3 reflected by the target object Ob in the detection area 10R, and a position detection unit 50 for detecting the position of the target object Ob based on the light reception result obtained from the light detector 30.

As illustrated in FIGS. 2A and 2B, the position detection light source unit 11 of the projection type display system having the position detection function 100 in this embodiment has a plurality of light emitting elements 12, and a light source drive unit 14 for driving the plural light emitting elements 12. In this embodiment, the position detection light source unit 11 (the light emitting elements 12 and the light source drive unit 14) is provided on the image projection device 200. More specifically, the projection lens 210 is disposed on the front surface 201 of the image projection device 200 substantially at the center in the X direction, and the plural light emitting elements 12 are disposed on the front surface 201 on both sides of the projection lens 210 in the X axis direction.

The plural light emitting elements 12 are divided into a first light emitting element group 121, a second light emitting element group 122, a third light emitting element group 123, and a fourth light emitting element group 124 in four positions of the front surface 201 of the image projection device 200. Each of the first light emitting element group 121, the second light emitting group 122, the third light emitting element group 123, and the fourth light emitting element group 124 has the plural light emitting elements 12 in both the X axis direction and the Y axis direction. In this embodiment, each of the first light emitting group 121, the second light emitting group 122, the third light emitting element group 123, and the fourth light emitting element group 124 has six rows in the X axis direction and three rows in the Y axis direction.

The first light emitting element group 121 and the second light emitting element group 122 positioned on the one side X1 in the X axis direction with respect to the projection lens 210 are provided on a common substrate as a first light emitting element array 12a. The third light emitting element group 123 and the fourth light emitting element group 124 positioned on the other side X2 in the X axis direction with respect to the projection lens 210 are provided on a common substrate as a second light emitting element array 12b.

In this embodiment, the light emitting elements 12 are LEDs (light emitting diodes) or the like capable of emitting position detection light constituted by infrared light as divergence light. It is preferable that the position detection light has a wavelength range allowing efficient reflection by the target object Ob such as a finger and a touch pen. Thus, when the target object Ob is a human body such as a finger, it is preferable that the position detection light is infrared light having high reflectance on the surface of the human body (particularly near infrared light close to the visible light range such as light having a wavelength around 850 nm) or infrared light having 950 nm. In this embodiment, each of the light emitting elements 12 emits infrared light having the peak wavelength in the wavelength range around 850 nm. In some applications, an optical member such as a scattering plate and a prism sheet is provided on each of the light exit surfaces sides of the first light emitting element array 12a and the second light emitting element array 12b.

The light source drive unit 14 has a light source drive circuit 140 for driving the light emitting elements 12, and a light source controller 145 for controlling respective light emission intensities of the plural light emitting elements 12 via the light source drive circuit 140. The light source drive circuit 140 has a first light source drive circuit 141 for driving the light emitting elements 12 included in the first light emitting element array 12a, and a second light source drive circuit 142 for driving the light emitting elements 12 included in the second light emitting element array 12b. The light source controller 145 controls both the first light source drive circuit 141 and the second light source drive circuit 142.

In this embodiment, the light detector 30 and the position detection unit 50 are disposed on the image projection device 200 similarly to the position detection light source unit 11. The position detection unit 50 is positioned inside the image projection device 200.

The light detector 30 has a first light detector 31 and a second light detector 32 as two components disposed on the front surface 201 of the image projection device 200 on one side and the other side of the projection lens 210 in the Y axis direction, respectively. The light detector 30 (the first light detector 31 and the second light detector 32) is constituted by photo-diodes or photo-transistors, for example. In this embodiment, the light detector 30 is constituted by photodiodes. The first light detector 31 and the second light detector 32 are electrically connected with the position detection unit 50, and the detection results from the first light detector 31 and the second light detector 32 are outputted to the position detection unit 50. In this embodiment, the anode and the cathode of the first light detector 31 are electrically connected with the anode and the cathode of the second light detector 32, respectively, allowing the first light detector 31 and the second light detector 32 to be electrically connected in parallel.

Basic Theory of Coordinate Detection

According to the projection type display system having the position detection function 100 in this embodiment, the position detection light source unit 11 turns on the light emitting elements 12 and forms the intensity distribution of the position detection light L2 in the detection area 10R, and the position detection unit 50 detects the position of the target object Ob within the detection area 10R based on the detection result of the position detection light L2 reflected by the target object Ob and detected by the light detector 30 (the first light detector 31 and the second light detector 32). The structure of light intensity distribution and the theory of coordinate detection are now explained with reference to FIGS. 3A through 3C.

Figure 3A:
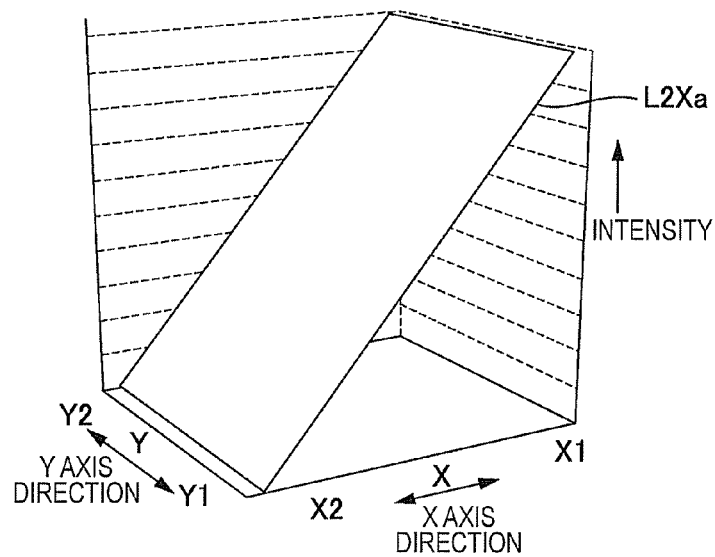
FIGS. 3A through 3C illustrate intensity distributions of position detection light used by the projection type display system having the position detection function according to the first embodiment of the invention and a process performed by a position detection unit.
Figure 3B:
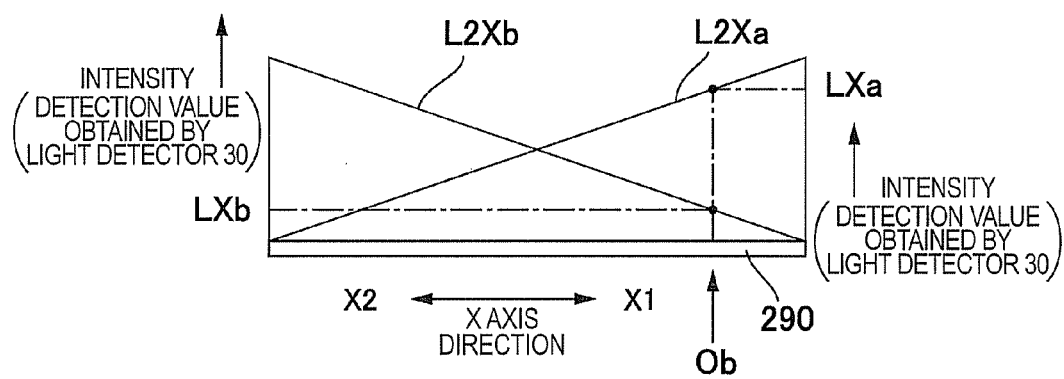
Figure 3C:
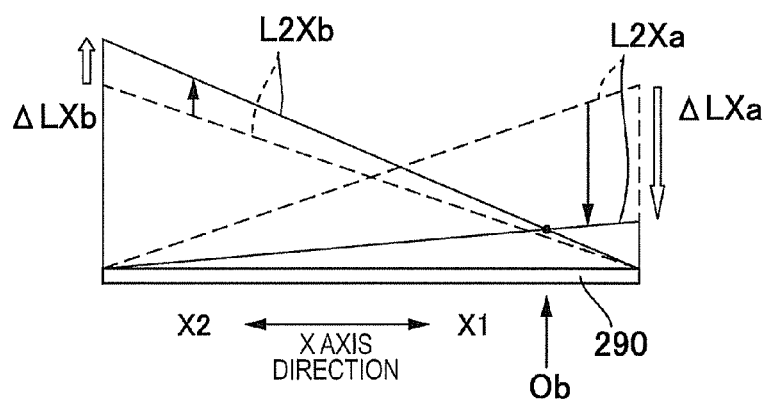

FIGS. 3A through 3C show intensity distributions of the position detection light used by the projection type display system having the position detection function 100 and a process performed by the position detection unit 50 according to the first embodiment, wherein: FIG. 3A shows an intensity distribution of the position detection light in the X axis direction; FIG. 3B shows intensities of the position detection light reflected by the target object; and FIG. 3C shows the control of the intensity distributions of the position detection light such that the intensities of the position detection light reflected by the target object can be uniform.

According to the projection type display system having the position detection function 100 in this embodiment, the intensity distribution of the position detection light L2 is produced in the detection area 10R based on the distance from the position detection light source unit 11 and the lighting pattern of the light emitting elements 12 when the position detection light L2 is emitted from the position detection light source unit 11. For detecting an X coordinate, for example, a first intensity distribution for X coordinate detection L2Xa where intensity monotonously decreases from the one side X1 to the other side X2 in the X axis direction is produced in a first term, and then a second intensity distribution for X coordinate detection L2Xb where intensity monotonously decreases from the other side X2 to the one side X1 in the X axis direction is produced in a second term as illustrated in FIGS. 3A and 3B. More preferably, the first intensity distribution for X coordinate detection L2Xa where intensity linearly decreases from the one side X1 to the other side X2 in the X axis direction is produced in the first term, and then the second intensity distribution for X coordinate detection L2Xb where intensity linearly decreases from the one other side X2 to the one side X1 in the X axis direction is produced in the second term. When the target object Ob is disposed in the detection area 10R, the position detection light L2 is reflected by the target object Ob. Then, a part of the reflection light is detected by the light detector 30. Thus, when the first intensity distribution for X coordinate detection L2Xa in the first term and the second intensity distribution L2Xb for X coordinate detection in the second term are provided as distributions established in advance, the X coordinate of the target object Ob can be detected by the following methods, for example, based on the detection result from the light detector 30.

For example, a first method uses the difference between the first intensity distribution for X coordinate detection L2Xa and the second intensity distribution for X coordinate detection L2Xb shown in FIG. 3B. Since the first intensity distribution for X coordinate detection L2Xa and the second intensity distribution for X coordinate detection L2Xb are distributions established in advance, the difference between the first intensity distribution for X coordinate detection L2Xa and the second intensity distribution for X coordinate detection L2Xb becomes a function determined beforehand. Thus, the X coordinate of the target object Ob can be detected by calculating the difference between a detection value Lxa obtained from the light detector 30 at the time when the first intensity distribution for X coordinate detection L2Xa in the first term is produced and a detection value LXb obtained from the light detector 30 at the time when the second intensity distribution for X coordinate detection L2Xb in the second term is produced. According to this method, even when environmental light other than the position detection light L2 such as infrared component contained in the external light enters the light detector 30, the intensity of the infrared component included in the environmental light is canceled at the time of calculation of the difference between the detection values LXa and LXb. Thus, the infrared component included in the environmental light does not affect the detection accuracy.

A second method detects the X coordinate of the target object Ob based on the adjustment of the control amount (drive current) over the light emitting elements 12 for controlling the detection value LXa obtained from the light detector 30 at the time when the first intensity distribution for X coordinate detection L2Xa in the first term is produced and the detection value LXb obtained from the light detector 30 at the time when the second intensity distribution for X coordinate detection L2Xb in the second term is produced such that these values LXa and LXb become equal. This method can be employed when the X coordinates of the first intensity distribution for X coordinate detection L2Xa and the second intensity distribution for X coordinate detection L2Xb shown in FIG. 3B linearly change.

Initially, the first intensity distribution for X coordinate detection L2Xa in the first term and the second intensity distribution for X coordinate detection L2Xb in the second term are so established as to have the same absolute values and reversely change in the X axis direction as illustrated in FIG. 3B. In this condition, when the detection value LXa obtained from the light detector 30 in the first term is equal to the detection value LXb obtained from the light detector 30 in the second term, it is determined that the target object Ob lies at the center in the X axis direction.

When the detection value LXa obtained from the light detector 30 in the first term is different from the detection value LXb obtained from the light detector 30 in the second term, the control amount (drive current) over the light emitting elements 12 is controlled such that the detection values LXa and LXb can be equalized. Then, the first intensity distribution for X coordinate detection L2Xa in the first term and the second intensity distribution for X coordinate detection L2Xb in the second term are again produced as illustrated in FIG. 3C. As a result, the detection value LXa from the light detector 30 in the first term and the detection value LXb from the light detector 30 in the second term become equal to each other, and thus the X coordinate of the target object Ob can be detected based on the ratio or difference between an adjustment amount ΔLXa for the adjustment of the control amount over the light emitting elements 12 in the first term and an adjustment amount ΔLXb for the adjustment of the control amount over the light emitting elements 12 in the second term, for example. According to this method, even when environmental light other than the position detection light L2 such as infrared component contained in the external light enters the light detector 30, the intensity of the infrared component included in the environmental light is canceled at the time of adjustment for the control amount over the light emitting elements 12 such that the detection values LXa and LXb can be equalized. Thus, the infrared component included in the environmental light does not affect the detection accuracy.

A third method detects the X coordinate of the target object Ob based on the adjustment of the control amount (drive current) over the light emitting elements 12 for controlling the detection value LXa obtained from the light detector 30 at the time when the first intensity distribution for X coordinate detection L2Xa in the first term is produced and the detection value LXb obtained from the light detector 30 at the time when the second intensity distribution for X coordinate detection L2Xb in the second term is produced such that these values LXa and LXb can be equalized similarly to the second method. This method can be employed when the X coordinates of the first intensity distribution for X coordinate detection L2Xa and the second intensity distribution for X coordinate detection L2Xb shown in FIG. 3B linearly change.

Initially, the first intensity distribution for X coordinate detection L2Xa in the first term and the second intensity distribution for X coordinate detection L2Xb in the second term are so established as to have the same absolute values and reversely change in the X axis direction as illustrated in FIG. 3B. In this condition, when the detection value LXa obtained from the light detector 30 in the first term is equal to the detection value LXb obtained from the light detector 30 in the second term, it is determined that the target object Ob lies at the center in the X axis direction.

When the detection value LXa from the light detector 30 in the first term is different from the detection value LXb from the light detector 30 in the second term, the control amount (drive current) over the light emitting elements 12 in the term corresponding to the lower detection value or in the term corresponding to the higher detection value is controlled, for example, such that the detection values LXa and LXb can be equalized. Then, the first intensity distribution for X coordinate detection L2Xa in the first term and the second intensity distribution for X coordinate detection L2Xb in the second term are again produced. According to the example shown in FIG. 3B, the control amount over the light emitting elements 12 in the first term is decreased by the adjustment amount ΔLXa, or the control amount over the light emitting elements 12 in the second term is increased by the adjustment amount ΔLXb, for example. As a result, the detection value LXa from the light detector 30 in the first term and the detection value LXb from the light detector 30 in the second term become equal to each other, and thus the X coordinate of the target object Ob can be detected based on the ratio or difference between the control amount over the light emitting elements 12 in the first term after adjustment of the control amount and the control amount over the light emitting elements 12 in the second term after adjustment of the control amount, for example. According to this method, even when environmental light other than the position detection light L2 such as infrared component contained in the external light enters the light detector 30, the intensity of the infrared component included in the environmental light is canceled at the time of adjustment for the control amount over the light emitting elements 12 such that the detection values LXa and LXb can be equalized. Thus, the infrared component included in the environmental light does not affect the detection accuracy.

In each of the first through third methods, a first intensity distribution for Y coordinate detection where the intensity monotonously decreases from the one side Y1 to the other side Y2 in the Y axis direction is produced in a third term, and then a second intensity distribution for Y coordinate detection where the intensity monotonously decreases from the other side Y2 to the one side Y1 in the Y axis direction is produced in a fourth term, based on the intensity distributions for Y coordinate detection the Y coordinate of the target object Ob can be detected. Also, an intensity distribution in the Z axis direction is produced in a fifth term, based on the intensity distribution the Z coordinate of the target object Ob can be detected.

According to this structure, the information on the position of the target object Ob within the detection area 10R based on the detection result from the light detector 30 can be obtained by executing predetermined software (operation program) using a microprocessor unit (MPU) as the position detection unit 50 for performing associated processes, for example. Alternatively, as described herein with reference to FIGS. 4A and 4B, the processes may be performed by a signal processing unit using hardware such as a logic circuit.

Structure Example of Position Detection Unit 50

Figures 4A, 4B:
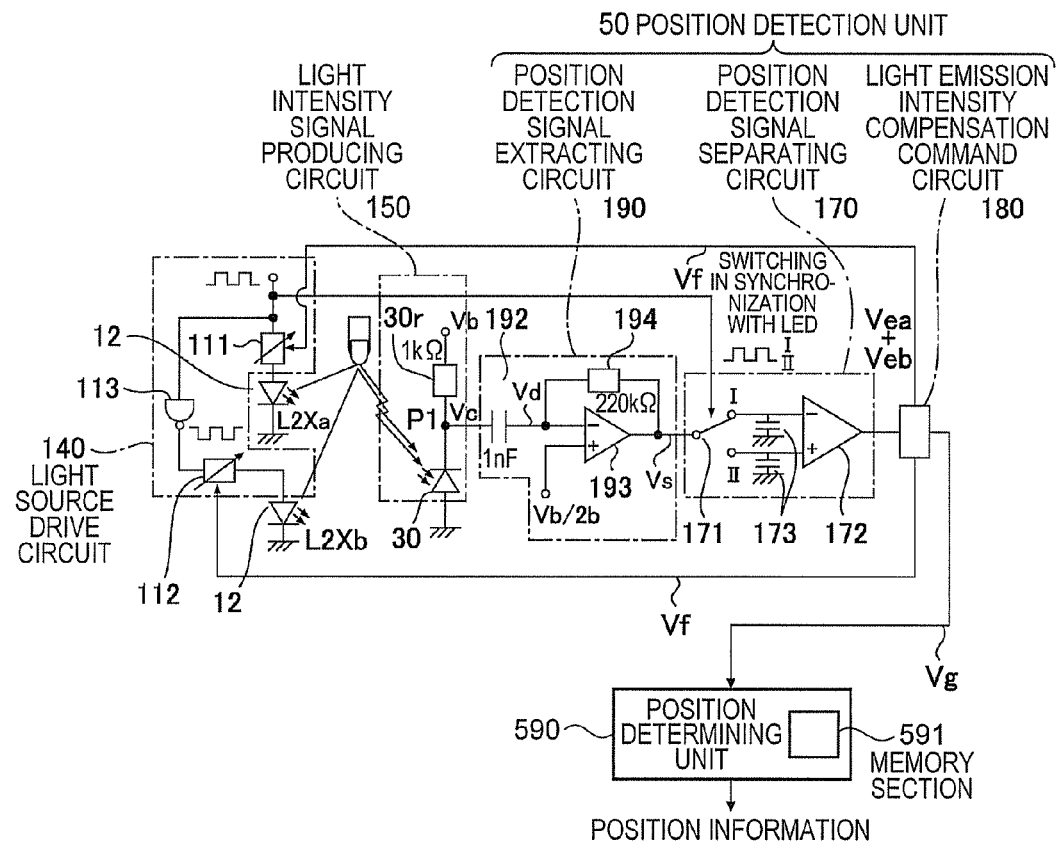
FIGS. 4A and 4B illustrate signal processing performed by the projection type display system having the position detection function according to the first embodiment of the invention.

FIGS. 4A and 4B illustrate signal processing performed by the projection type display system having the position detection function 100 according to the first embodiment of the invention, wherein: FIG. 4A shows the position detection unit 50 of the projection type display system having the position detection function 100 as an example of the invention; and FIG. 4B shows a process performed by a light emission intensity compensation command section of the position detection unit 50. The position detection unit 50 explained herein carries out the method which detects the X coordinate of the target object Ob based on the adjustment of the control amount (drive current) over the light emitting elements 12 for controlling the detection values LXa and LXb obtained from the light detector 30 in the first term and the second term such that these values LXa and LXb can be equalized. Since the same structure is used for detecting the X coordinates and the Y coordinates, only the case for obtaining the X coordinates is herein discussed.

As illustrated in FIG. 4A, according to the projection type display system having the position detection function 100 in this embodiment, the light source drive circuit 140 applies a drive pulse of predetermined current to each of the plural light emitting elements 12 via a variable resistor 111 in the first term, and applies a drive pulse of predetermined current to each of the plural light emitting elements 12 via a variable resistor 112 and a reverse circuit 113 in the second term. Thus, the light source drive circuit 140 applies drive pulses in opposite phases to the light emitting elements 12 in the first term and the second term. Then, the position detection light L2 at the time when the first intensity distribution for X coordinate detection L2Xa in the first term is produced is reflected by the target object Ob and received by the common light detector 30, and the position detection light L2 at the time when the second intensity distribution for X coordinate detection L2Xb in the second term is produced is reflected by the target object Ob and received by the common light detector 30. In the section of a light intensity signal producing circuit 150, a resistor 30r having approximately 1 kΩ is electrically connected with the light detector 30 in series, and bias voltage Vb is applied to both ends of the connected light detector 30 and resistor 30r.

In the light intensity signal producing circuit 150, the position detection unit 50 is electrically connected with a connection point P1 between the light detector 30 and the resistor 30r. A detection signal Vc outputted from the connection point P1 between the light detector 30 and the resistor 30r is expressed by the following equation.

$$Vc = V30 / (V30 + \text{resistance value of resistor } 30r)$$

V30: equivalent resistance of light detector 30

Thus, comparing the case in which the environmental light does not enter the light detector 30 with the case in which the environmental light enters the light detector 30, the level and the amplitude of the detection signal Vc become higher when the environmental light enters the light detector 30.

The position detection unit 50 chiefly includes a position detection signal extracting circuit 190, a position detection signal separating circuit 170, and a light emission intensity compensation command circuit 180.

The position detection signal extracting circuit 190 has a filter 192 constituted by a capacitor of approximately 1 nF. The filter 192 functions as a high-pass filter which removes a direct current component from a signal outputted from the connection point P1 between the light detector 30 and the resistor 30r. Thus, the filter 192 extracts a position detection signal Vd of the position detection light L2 produced by the light detector 30 in each of the first term and the second term from the detection signal Vc outputted from the connection point P1 between the light detector 30 and the resistor 30r. In other words, the filter 192 removes a low frequency component or a direct current component contained in the environmental light based on the determination that the intensity of the environmental light is constant in a certain period unlike the modulated position detection light L2.

The position detection signal extracting circuit 190 has an addition circuit 193 including a feedback resistor 194 of approximately 220 kΩ and disposed after the filter 192. The position detection signal Vd extracted by the filter 192 is outputted to the position detection signal separating circuit 170 as a position detection signal Vs superimposed on voltage V/2 as the bias voltage Vb multiplied by ½.

The position detection signal separating circuit 170 includes a switch 171 for switching in synchronization with the drive pulse applied to the light emitting elements 12 in the first term, a comparator 172, and capacitors 173 electrically connected with respective input lines of the comparator 172. Thus, when the position detection signal Vs is inputted to the position detection signal separating circuit 170, an effective value Vea of the position detection signal Vs in the first term and an effective value Veb of the position detection signal Vs in the second term are alternately outputted from the position detection signal separating circuit 170 to the light emission intensity compensation command circuit 180.

The light emission intensity compensation command circuit 180 compares the effective values Vea and Veb, performs the process shown in FIG. 4B, and outputs a control signal Vf to the light source drive circuit 140 to control the effective value Vea of the position detection signal Vs in the first term and the effective value Veb of the position detection signal Vs in the second term such that these values Vea and Veb have the same level. More specifically, the light emission intensity compensation command circuit 180 compares the effective value Vea of the position detection signal Vs in the first term and the effective value Veb of the position detection signal Vs in the second term, and maintains the current drive condition when determining that these values Vea and Veb are equal. However, when the effective value Vea of the position detection signal Vs in the first term is lower than the effective value Veb of the position detection signal Vs in the second term, the light emission intensity compensation command circuit 180 lowers the resistance value of the variable resistor 111 to raise the light emission amount from the light emitting elements 12 in the first term. When the effective value Veb of the position detection signal Vs in the second term is lower than the effective value Vea of the position detection signal Vs in the first term, the light emission intensity compensation command circuit 180 lowers the resistance value of the variable resistor 112 to raise the light emission amount in the second term.

By this method, the projection type display system having the position detection function 100 controls the control amounts (current amounts) over position detection light sources 12A and 12B by using the light emission intensity compensation command circuit 180 of the position detection unit 50 such that the detection values from the light detector 30 in the first term and the second term become equal. In this case, the light emission intensity compensation command circuit 180 has information about the control amount over the light emitting elements 12 for controlling the effective value Vea of the position detection signal Vs in the first term and the effective value Veb of the position detection signal Vs in the second term such that these values Vea and Veb have the same level. Thus, this information is outputted to a position determining unit 590 as a position detection signal Vg, and the position determining unit 590 calculates the X coordinate of the target object Ob in the detection area 10R based on the position detection signal Vg. Similarly, the position determining unit 590 calculates the Y coordinate of the target object Ob in the detection area 10R based on the same theory.

According to this embodiment, the filter 192 in the position detection signal extracting circuit 190 removes the direct current component contained in the environmental light from the detection signal Vc outputted from the connection point P1 between the light detector 30 and the resistor 30r to extract the position detection signal Vd. Thus, even when a signal component contained in the infrared component of the environmental light is included in the detection signal Vc outputted from the connection point P1 between the light detector 30 and the resistor 30r, the effect of the environmental light can be canceled.

X Coordinate Detection Operation

Figure 6A:
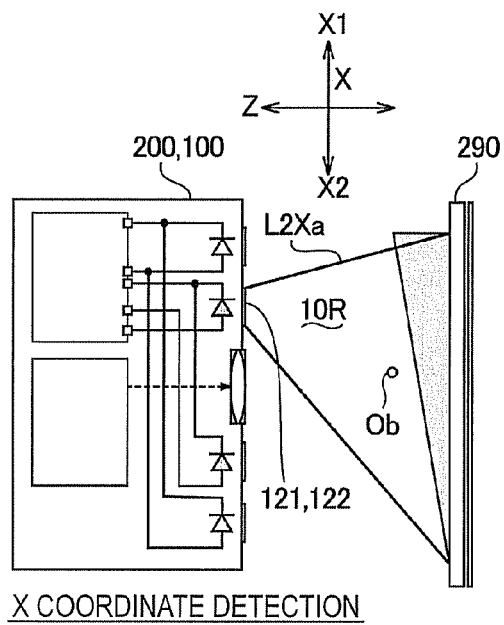
FIGS. 6A through 6D illustrate intensity distributions of position detection light produced by the projection type display system having the position detection function according to the first embodiment of the invention.
Figure 6B:
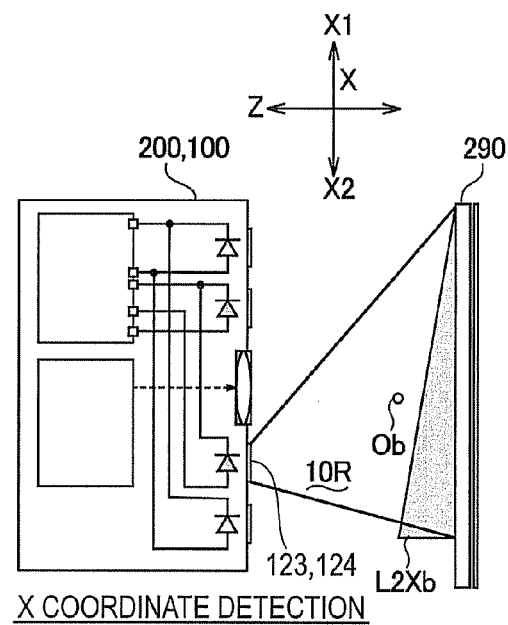
Figure 6C:
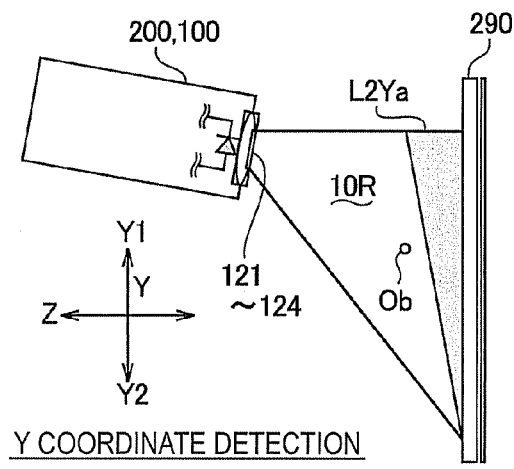
Figure 6D:
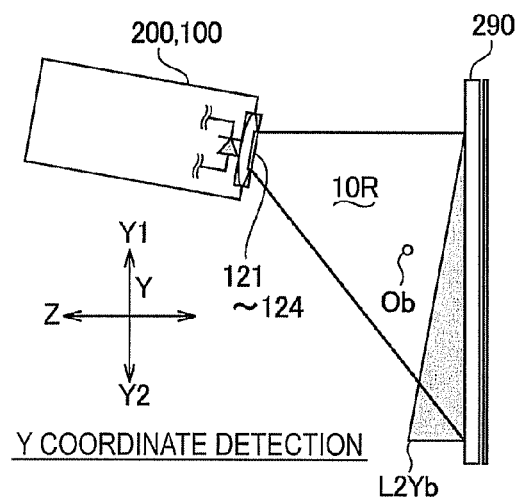

The operation for detecting the position of the target object Ob within the detection area 10R performed by the projection type display system having the position detection function 100 in this embodiment is now explained with reference to FIGS. 5A through 5D and FIGS. 6A through 6D. FIGS. 5A through 5D illustrate the control of the light emitting elements 12 in the projection type display system having the position detection function 100 according to the first embodiment of the invention, wherein: FIGS. 5A and 5B show the balance of light emission intensities of the plural light emitting elements 12 at the time of detection of the X coordinate of the target object Ob; and FIGS. 5C and 5D show the balance of the light emission intensities of the plural light emitting elements 12 at the time of detection of the Y coordinate of the target object Ob. FIGS. 6A through 6D illustrate the intensity distributions of the position detection light formed by the projection type display system having the position detection function 100 according to the first embodiment of the invention, wherein: FIGS. 6A and 6B show the intensity distributions for X coordinate detection at the time of detection of the X coordinate of the target object Ob; and FIGS. 6C and 6D show the intensity distributions for Y coordinate detection at the time of detection of the Y coordinate of the target object Ob.

For detecting the X-Y coordinates of the target object Ob within the detection area 10R, the projection type display system having the position detection function 100 detects the X coordinate during the first and the second terms, and detects the Y coordinate during the third and the fourth terms as described below. In addition, the projection type display system having the position detection function 100 in this embodiment detects the Z coordinate in the fifth term. In this case, each of the first term through the fifth term continues for several microseconds.

For detecting the X coordinate of the target object Ob within the detection area 10R, the projection type display system having the position detection function 100 in this embodiment turns on all of the light emitting elements 12 included in the first light emitting element group 121 and the second light emitting element group 122, and turns off all of the light emitting elements 12 included in the third light emitting element group 123 and the fourth light emitting element group 124 in the first term as illustrated in FIG. 5A. In this case, the light emitting elements 12 positioned on the one side X1 in the X axis direction in each of the first light emitting element group 121 and the second light emitting element group 122 have high light emission intensities, and the light emission intensities of the light emitting elements 12 lower from the one side X1 toward the other side X2 in the X axis direction. The balance of the light emission amount can be adjusted by the first light source drive circuit 141 controlled by the light source controller 145. As a result, the first intensity distribution for X coordinate detection L2Xa in which the intensity of the position detection light monotonously decreases from the one side X1 to the other side X2 in the X axis direction as shown in FIG. 6A is produced. According to the first intensity distribution for X coordinate detection L2Xa in this embodiment, the intensity of the position detection light continuously and linearly decreases from the one side X1 to the other side X2 in the X axis direction. The first intensity distribution for X coordinate detection L2Xa in this case has a constant relationship between the position in the X axis direction and the intensity of the position detection light. Thus, the light amount reflected by the target object Ob and detected by the light detector 30 (the first light detector 31 and the second light detector 32) is a value proportional to the intensity of the position detection light in the first intensity distribution for X coordinate detection L2Xa and determined by the position of the target object Ob.

In the second term, the projection type display system having the position detection function 100 turns on all of the light emitting elements 12 included in the third light emitting element group 123 and the fourth light emitting element group 124, and turns off all of the light emitting elements 12 included in the first light emitting element group 121 and the second light emitting element group 122 as illustrated in FIG. 5B. In this case, the light emitting elements 12 positioned on the one other side X2 in the X axis direction in each of the third light emitting element group 123 and the fourth light emitting element group 124 have high light emission intensities, and the light emission intensities of the light emitting elements 12 lower from the one other side X2 toward the one side X1 in the X axis direction. The balance of the light emission amount can be adjusted by the second light source drive circuit 142 controlled by the light source controller 145. As a result, the second intensity distribution for X coordinate detection L2Xb in which the intensity of the position detection light monotonously decreases from the other side X2 to the one side X1 in the X axis direction as shown in FIG. 6B is produced. According to the second intensity distribution for X coordinate detection L2Xb in this embodiment, the intensity of the position detection light continuously and linearly decreases from the other side X2 to the one side X1 in the X axis direction. The second intensity distribution for X coordinate detection L2Xb in this case has a constant relationship between the position in the X axis direction and the intensity of the position detection light similarly to the first intensity distribution for X coordinate detection L2Xa. Thus, the light amount reflected by the target object Ob and detected by the light detector 30 (the first light detector 31 and the second light detector 32) is a value proportional to the intensity of the position detection light in the second intensity distribution for X coordinate detection L2Xb and determined by the position of the target object Ob.

Thus, the difference or ratio between the light amount detected by the light detector 30 (the first light detector 31 and the second light detector 32) in the first term and the light amount detected by the light detector 30 (the first light detector 31 and the second light detector 32) in the second term is determined by the position of the target object Ob. Accordingly, the position detection unit 50 can detect the X coordinate of the target object Ob based on the detection result from the light detector 30 in the first term and the detection result from the light detector 30 in the second term.

Y Coordinate Detection Operation

For detecting the Y coordinate of the target object Ob within the detection area 10R, the projection type display system having the position detection function 100 according to this embodiment turns on all of the light emitting elements 12 included in the first light emitting element group 121, the second light emitting element group 122, the third light emitting element group 123, and the fourth light emitting element group 124 in the third term as illustrated in FIG. 5C. In this case, the light emitting elements 12 positioned on the one side Y1 in the Y axis direction in each of the first light emitting element group 121, the second light emitting element group 122, the third light emitting element group 123, and the fourth light emitting element group 124 have high light emission intensities, and the light emission intensities of the light emitting elements 12 lower from the one side Y1 toward the other side Y2 in the Y axis direction. The balance of the light emission amount can be adjusted by the first light source drive circuit 141 and the second light source drive circuit 142 controlled by the light source controller 145. As a result, the first intensity distribution for Y coordinate detection L2Ya in which the intensity of the position detection light monotonously decreases from the one side Y1 to the other side Y2 in the Y axis direction as shown in FIG. 6C is produced. According to the first intensity distribution for Y coordinate detection L2Ya in this embodiment, the intensity of the position detection light continuously and linearly decreases from the one side Y1 to the other side Y2 in the Y axis direction. The first intensity distribution for Y coordinate detection L2Ya in this case has a constant relationship between the position in the Y axis direction and the intensity of the position detection light. Thus, the light amount reflected by the target object Ob and detected by the light detector 30 (the first light detector 31 and the second light detector 32) is a value proportional to the intensity of the position detection light in the first intensity distribution for Y coordinate detection L2Ya and determined by the position of the target object Ob.

In the fourth term, the projection type display system having the position detection function 100 turns on all of the light emitting elements 12 included in the first light emitting element group 121, the second light emitting element group 122, the third light emitting element group 123, and the fourth light emitting element group 124 as illustrated in FIG. 5D. In this case, the light emitting elements 12 positioned on the one other side Y2 in the Y axis direction in each of the first light emitting element group 121, the second light emitting element group 122, the third light emitting element group 123, and the fourth light emitting element group 124 have high light emission intensities, and the light emission intensities of the light emitting elements 12 lower from the other side Y2 toward the one side Y1 in the Y axis direction. The balance of the light emission amount can be adjusted by the first light source drive circuit 141 and the second light source drive circuit 142 controlled by the light source controller 145. As a result, the second intensity distribution for Y coordinate detection L2Yb in which the intensity of the position detection light monotonously decreases from the other side Y2 to the one side Y1 in the Y axis direction as shown in FIG. 6D is produced. According to the second intensity distribution for Y coordinate detection L2Yb in this embodiment, the intensity of the position detection light continuously and linearly decreases from the other side Y2 to the one side Y1 in the Y axis direction. The second intensity distribution for Y coordinate detection L2Yb in this case has a constant relationship between the position in the Y axis direction and the intensity of the position detection light similarly to the first intensity distribution for Y coordinate detection L2Ya. Thus, the light amount reflected by the target object Ob and detected by the light detector 30 (the first light detector 31 and the second light detector 32) is a value proportional to the intensity of the position detection light in the second intensity distribution for Y coordinate detection L2Yb and determined by the position of the target object Ob.

Thus, the difference or ratio between the light amount detected by the light detector 30 (the first light detector 31 and the second light detector 32) in the third term and the light amount detected by the light detector 30 (the first light detector 31 and the second light detector 32) in the fourth term is determined by the position of the target object Ob. Accordingly, the position detection unit 50 can detect the Y coordinate of the target object Ob based on the detection result from the light detector 30 in the third term and the detection result from the light detector 30 in the fourth term.

Z Coordinate Detection Operation

For detecting the Z coordinate of the target object Ob within the detection area 10R, the projection type display system having the position detection function 100 in this embodiment turns on all of the light emitting elements 12 included in the first light emitting element group 121, the second light emitting element group 122, the third light emitting element group 123, and the fourth light emitting element group 124 such that these light emitting elements 12 have the same luminance in the fifth term. As a result, the intensity distribution for Z coordinate detection in which the intensity of the position detection light monotonously decreases from the position of the image projection device toward the screen 290 in the Z axis direction is produced. According to the intensity distribution for Z coordinate detection in this case has a constant relationship between the position in the Z axis direction and the intensity of the position detection light. Thus, the light amount reflected by the target object Ob and detected by the light detector 30 (the first light detector 31 and the second light detector 32) is a value proportional to the intensity of the position detection light in the intensity distribution for Z coordinate detection and determined by the position of the target object Ob.

Accordingly, the Z coordinate of the target object Ob can be detected based on the detection result from the light detector 30 (the first light detector 31 and the second light detector 32) in the fifth term.

This Z coordinate detection can be used for establishing a predetermined range in the Z axis direction in the detection area 10R as a detection effective area. For example, in case of the detection effective area defined as a range within 5 cm from the surface of the screen 290, the detection result may be determined as ineffective when the target object Ob is detected at a position out of the range of 5 cm from the surface of the screen 290. Thus, only the detection of the target object Ob within the range of 5 cm from the surface of the screen 290 may be determined as the input of the X and Y coordinates of the target object Ob, for example.

Main Advantages of First Embodiment

According to this embodiment, the projection type display system having the position detection function 100 includes the position detection light source unit 11 which emits position detection light constituted by infrared light toward the detection area 10R to detect the position detection light reflected by the target object Ob in the detection area 10R by using the light detector 30. Since the position detection light emitted from the position detection light source unit 11 produces the intensity distribution in the detection area 10R, the position detection unit 50 can detect the position of the target object Ob based on the light reception result obtained from the light detector 30 by determining the relationship between the position within the detection area 10R and the intensity of the position detection light beforehand. Moreover, the position detection light L2 constituted by infrared light does not become an obstacle to image display.

According to this embodiment, the intensity distribution of the position detection light L2 monotonously decreases or monotonously increases from the one side to the other side. Thus, the position of the target object Ob can be accurately detected by a relatively simple process. Particularly, since the intensity of the position detection light L2 linearly changes in the intensity distribution of the position detection light L2 in this embodiment, the position of the target object Ob can be accurately detected by a simple process.

The position detection light source unit 11 provided on the image projection device 200 emits position detection light toward the detection area 10R. Thus, the necessity of providing a number of the light emitting elements 12 around the detection area 10R is eliminated.

According to this embodiment, the position detection light source unit 11, the light detector 30, and the position detection unit 50 are all disposed on the image projection device 200. In this case, the elements necessary for position detection are all equipped on the image projection device 200. Thus, the portability improves, and the optical axis direction of the light detector 30 is adjustable by controlling the direction of the image projection device 200.

The position detection light source unit 11 emits the position detection light from the front surface 201 of the image projection device 200 where the projection lens 210 for projecting images is disposed. Thus, the emission directions of the light for image display and the position detection light can be adjusted only by controlling the direction of the front surface 201 of the image projection device 200. Moreover, the light detector 30 is provided on the front surface 201 of the image projection device 200 similarly to the position detection light source unit 11. Thus, the light detector 30 can be securely disposed in the same direction as those of the light for image display and the position detection light. Accordingly, the emission directions of the light for image display and the position detection light, and the direction of the optical axis center of the light detector 30 can be adjusted only by controlling the direction of the front surface 201 of the image projection device 200.

According to this embodiment, the position detection light source unit 11 produces the first intensity distribution for X coordinate detection L2Xa in which the light amount decreases from the one side X1 to the other side X2 in the X axis direction, and the second intensity distribution for X coordinate detection L2Xb in which the intensity changes in the direction opposite to the direction of the first intensity distribution for X coordinate detection L2Xa. Thus, the X coordinate can be detected from the difference between the detection result from the light detector 30 at the time when the first intensity distribution for X coordinate detection L2Xa is produced and the detection result from the light detector 30 at the time when the second intensity distribution for X coordinate detection L2Xb is produced. In this case, the effect of infrared light included in external light or the like can be canceled, and thus the X coordinate can be accurately detected. In addition, the position detection light source unit 11 produces the first intensity distribution for Y coordinate detection L2Ya in which the light amount decreases from the one side Y1 to the other side Y2 in the Y axis direction, and the second intensity distribution for Y coordinate detection L2Yb in which the intensity changes in the direction opposite to the direction of the first intensity distribution for Y coordinate detection L2Ya. Thus, the Y coordinate can be detected from the difference between the detection result from the light detector 30 at the time when the first intensity distribution for Y coordinate detection L2Ya is produced and the detection result from the light detector 30 at the time when the second intensity distribution for Y coordinate detection L2Yb is produced. In this case, the effect of infrared light included in external light or the like can be canceled, and thus the Y coordinate can be accurately detected.

The position detection light source unit 11 has the plural light emitting elements 12 for emitting position detection light, and produces the intensity distribution of the position detection light while controlling the balance of the emission light amount from the plural light emitting elements 12. Thus, the intensity distribution of the position detection light can be formed in various directions only by using a relatively small number of the light emitting elements. In addition, the light emitting elements 12 have plural rows in both the X axis direction and the Y axis direction. Thus, the intensity distribution for X coordinate detection and the intensity distribution for Y coordinate detection can be easily produced.

According to this embodiment, the numbers of the light emitting elements 12 disposed in the X axis direction and the Y axis direction are determined in correspondence with the shape of the screen 290 elongated in the horizontal direction. In addition, according to this embodiment, the Y coordinate is detected by using all the light emitting elements 12, and the X coordinate is detected by using either the first light emitting element array 12a or the second light emitting element array 12b in correspondence with the numbers of the light emitting elements 12 disposed in the X axis direction and the Y axis direction. Thus, the intensity distribution for X coordinate detection and the intensity distribution for Y coordinate detection having equivalent intensities can be produced. Since the light intensities received by the light detector 30 are equivalent for both the X coordinate detection and the Y coordinate detection, the signal processing by the position detection unit 50 can be simplified.

Second Embodiment

Second through fourth embodiments are hereinafter described. These embodiments have basic structures similar to the structure of the first embodiment, and therefore will be explained with reference to FIGS. 5A through 5D and FIGS. 6A through 6D as necessary.

According to the first embodiment, all of the light emitting elements 12 included in the first light emitting element array 12a and the second light emitting element array 12b are used for detecting the Y coordinate, and either the first light emitting element array 12a or the second light emitting element array 12b is used for detecting the X coordinate. In this embodiment, however, all of the light emitting elements 12 shown in FIGS. 5A through 5D are used for detecting the X coordinate similarly to the detection of the Y coordinate. Other structures are similar to those of the first embodiment.

Third Embodiment

According to the first embodiment, two or four of the first light emitting element group 121, the second light emitting element group 122, the third light emitting element group 123, and the fourth light emitting element group 124 are driven for detecting the X coordinate and the Y coordinate. In this embodiment, however, only one of the first light emitting element group 121, the second light emitting element group 122, the third light emitting element group 123, and the fourth light emitting element group 124 is driven at a time for each detection of the X coordinate and the Y coordinate. For example, the first intensity distribution for X coordinate detection L2Xa shown in FIG. 6A is produced by using the first light emitting element group 121, and the second intensity distribution for X coordinate detection L2Xb shown in FIG. 6B is produced by using the second light emitting element group 122. Also, the first intensity distribution for Y coordinate detection L2Ya shown in FIG. 6C is produced by using the third light emitting element group 123, and the second intensity distribution for Y coordinate detection L2Yb shown in FIG. 6D is produced by using the fourth light emitting element group 124. Other structures are similar to those of the first embodiment.

Fourth Embodiment

According to the first embodiment, the plural light emitting elements 12 have the respective wavelength peaks in the same wavelength range. However, the position detection light source unit 11 may have first light emitting elements for emitting first infrared light having the wavelength peak in a first wavelength range, and second light emitting elements for emitting second infrared light having the wavelength peak in a second wavelength range different from the first wavelength range as the plural light emitting elements 12. For example, the light emitting elements 12 included in the first light emitting element group 121 and the light emitting elements 12 included in the third light emitting element group 123 may be the first light emitting elements for emitting the first infrared light having the peak wavelength in the first wavelength range around 850 nm, and the light emitting elements 12 included in the second light emitting element group 122 and the light emitting elements 12 included in the fourth light emitting element group 124 may be the second light emitting elements for emitting the second infrared light having the peak wavelength in the second wavelength range around 950 nm. According to this structure, the first light detector 31 as one of the first and second light detectors 31 and 32 included in the light detector 30 is a light detector having the sensitivity peak in the first wavelength range around 850 nm, and the second light detector 32 as the other light detector is a light detector having the sensitivity peak in the second wavelength range around 950 nm.

According to this structure, the first intensity distribution for X coordinate detection L2Xa shown in FIG. 6A is produced by using the light emitting elements 12 belonging to the first light emitting element group 121 and the third light emitting element group 123, and simultaneously the first intensity distribution for Y coordinate detection L2Ya shown in FIG. 6C is produced by using the light emitting elements 12 belonging to the second light emitting element group 122 and the fourth light emitting element group 124 in the first term, for example. In this case, the first light detector 31 detects the first infrared light in the first intensity distribution for X coordinate detection L2Xa, and the second light detector 32 detects the second infrared light in the first intensity distribution for Y coordinate detection L2Ya.

In the second term, the second intensity distribution for X coordinate detection L2Xb shown in FIG. 6B is produced by using the light emitting elements 12 belonging to the first light emitting element group 121 and the third light emitting element group 123, and simultaneously the second intensity distribution for Y coordinate detection L2Yb shown in FIG. 6D is produced by using the light emitting elements 12 belonging to the second light emitting element group 122 and the fourth light emitting element group 124. In this case, the first light detector 31 detects the first infrared light in the second intensity distribution for X coordinate detection L2Xb, and the second light detector 32 detects the second infrared light in the second intensity distribution for Y coordinate detection L2Yb.

According to this structure, the X coordinate of the target object Ob can be detected based on the difference or the ratio between the light amount detected by the first light detector 31 in the first term and the light amount detected by the first light detector 31 in the second term. Also, the Y coordinate of the target object Ob can be detected based on the difference or the ratio between the light amount detected by the second light detector 32 in the first term and the light amount detected by the second light detector 32 in the second term. Thus, the time required for detection of the coordinates can be shortened.

Fifth Embodiment

Figure 7:
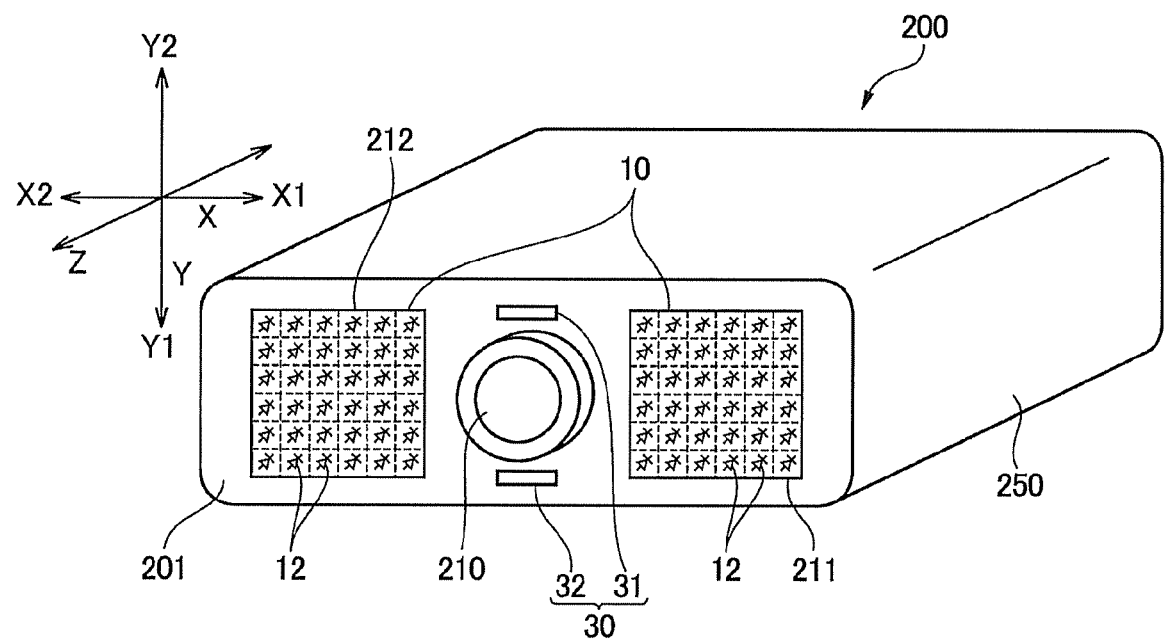
FIG. 7 schematically illustrates the main part of the structure of a projection type display system having a position detection function according to a fifth embodiment of the invention as diagonally viewed from above.

FIG. 7 schematically illustrates the main part of the structure of a projection type display system having a position detection function according to a fifth embodiment of the invention as diagonally viewed from above. The basic structure in this embodiment is similar to that of the first embodiment. Thus, the same reference numbers are given to common parts, and the same explanation is not repeated.

According to the first embodiment, the plural light emitting elements 12 have the four groups of the first light emitting element group 121, the second light emitting element group 122, the third light emitting element group 123, and the fourth light emitting element group 124. However, the plural light emitting elements 12 may be divided into different groups. For example, the light emitting elements 12 may have only two groups of the first light emitting element group 121 and the second light emitting element group 122 disposed on the one side and the other side of the projection lens 210 in the X axis direction, respectively.

Error Correction Method

The projection type display system having the position detection function 100 according to the embodiments of the invention can correct errors by the following methods.

First Example of Error Correction Method

Figure 8A:
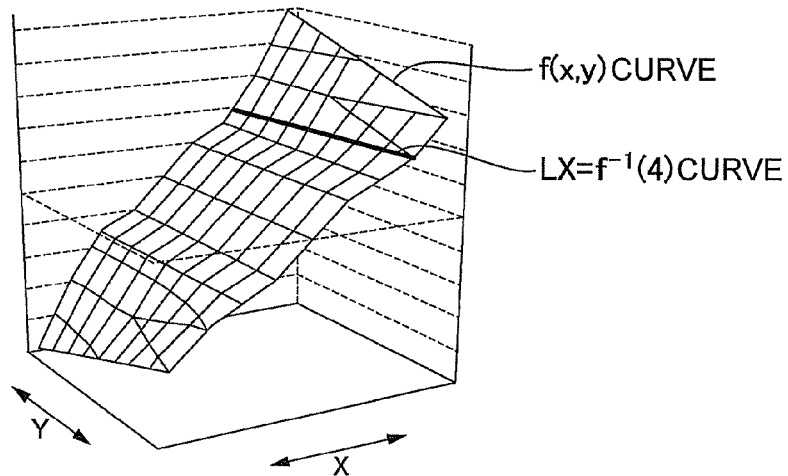
FIGS. 8A through 8C illustrate a first example of an error correction method performed by the projection type display system having the position detection function according to the embodiments of the invention.
Figure 8B:
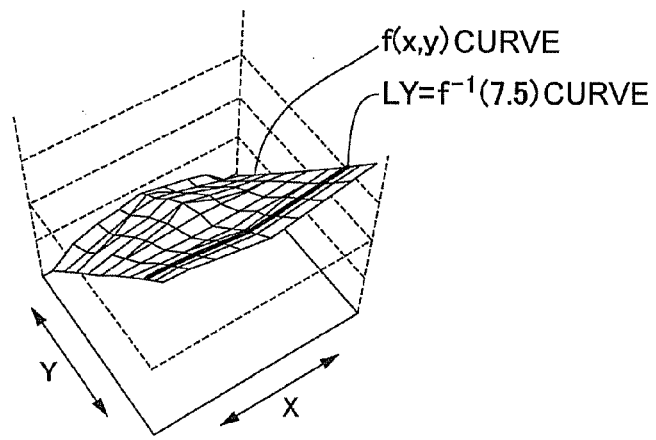
Figure 8C:
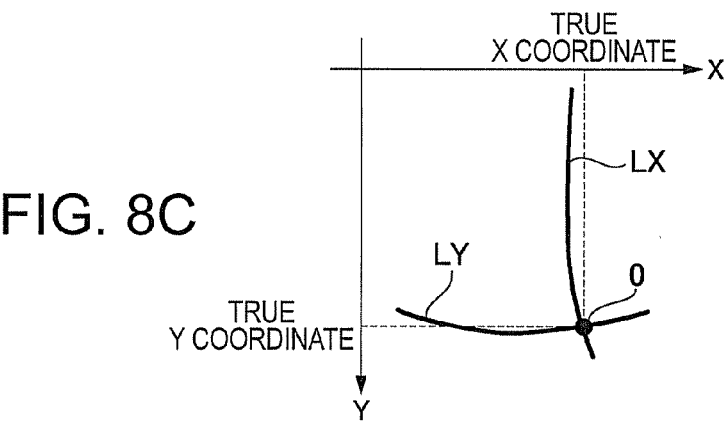

FIGS. 8A through 8C illustrate a first example of the error correction method performed by the projection type display system having the position detection function 100 according to the invention, wherein: FIG. 8A shows correction of the X coordinate position; FIG. 8B shows correction of the Y coordinate position; and FIG. 8C shows a calculation method of the coordinate positions.

According to the projection type display system having the position detection function 100 in this example, the intensity distribution for X coordinate detection which monotonously decreases in the X axis direction and is constant in the Y axis direction as shown in FIG. 3A is used for determining the X coordinate of the target object Ob. In fact, however, the intensity varies in the Y axis direction in some cases as illustrated in FIG. 8A. In addition, in the intensity distribution for Y coordinate detection, the intensity varies in the X axis direction in some cases as illustrated in FIG. 8B. In this case, the position of the target object Ob in the distorted detection area 10R is detected. According to this example, therefore, a function for determining the relationship between the results of the respective positions in the detection area 10R obtained from the light detector 30 and the coordinate positions in the detection area 10R and its inverse function are stored in a memory section 591 of the position determining unit 590 shown in FIG. 4A. Thus, the position determining unit 590 determines the position of the target object Ob by using the function and the inverse function stored in the memory section 591 based on the inverse function and the light reception intensity obtained from the light detector 30.

For explaining the correction method with reference to FIGS. 8A through 8C, it is assumed that the following correction is applied to the light reception intensity obtained from the light detector 30 for each of the positions in the detection area 10R for easy understanding of the basic theory.

In this example, a function of a curve for determining light amount distribution f(x,y) is initially obtained, and its inverse function $f^{-1}(p)$ (p: light amount; result obtained from the light detector 30) is stored in the memory section 591.

For determining the X coordinate position of the target object Ob, the light reception intensity p obtained from the light detector 30 is substituted in the inverse function $f^{-1}(p)$ to obtain the position of the target object Ob in the detection area 10R. For example, when the reception light intensity p obtained from the light detector 30 is 4, the inverse function $f^{-1}(4)$ is calculated. This result is represented by a bold line LX.

Then, for determining the Y coordinate position of the target object Ob, the light reception intensity p obtained from the light detector 30 is substituted in the inverse function $f^{-1}(p)$ to obtain the position of the target object Ob in the detection area 10R. For example, when the reception light intensity p obtained from the light detector 30 is 7.5, the inverse function $f^{-1}(7.5)$ is calculated. This result is represented by a bold line LY.

Thus, as illustrated in FIG. 8C, a cross point O of the bold line LX shown in FIG. 8A and the bold line LY shown in FIG. 8B when projected on the X-Y coordinates corresponds to the position of the target object Ob. The position of the target object Ob calculated by this method is a true position after correction of the error caused by the deviation from the linear relationship of the intensity distribution in the detection area 10R. Accordingly, the position of the target object Ob can be accurately determined in this example.

While the inverse function $f^{-1}(p)$ is stored in the memory section 591 in this example, the function f(x,y) may be stored in the memory section 591.

Second Example of Error Correction Method

Figure 9A:
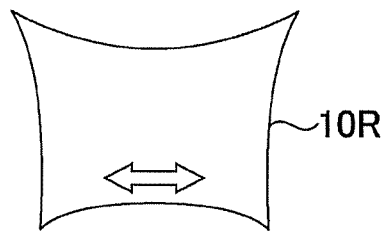
FIGS. 9A through 9C illustrate a second example of an error correction method performed by the projection type display system having the position detection function according to the embodiments of the invention.
Figure 9B:
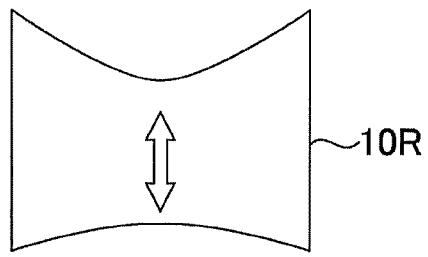
Figure 9C:
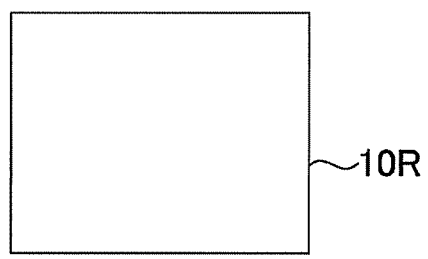

FIGS. 9A through 9C illustrate a second example of the error correction method performed by the projection type display system having the position detection function 100 according to the embodiments of the invention. In this example, the position determining unit 590 shown in FIG. 4A stores correction information in the memory section 591 as information for correcting the calculation result of the coordinates obtained when the intensity distribution of the position detection light L2 in the detection area 10R is regarded as a linear relationship. In case of determination of the X coordinate of the target object Ob, the position in the X axis direction of the target object Ob is determined based on the calculation result of the X coordinate obtained when the intensity distribution of the position detection light L2 is regarded as a linear relationship and the correction information stored in the memory section 591. In this case, the shape of the detection area 10R distorted in both the X direction and the Y direction as shown in FIG. 9A can be converted into a corrected shape in the X direction as shown in FIG. 9B. In case of determination of the Y coordinate of the target object Ob, the position in the Y axis direction of the target object Ob is determined based on the calculation result of the Y coordinate obtained when the intensity distribution of the position detection light L2 in the detection area 10R is regarded as a linear relationship and the correction information stored in the memory section 591. In this case, the shape of the detection area 10R distorted in the Y direction as shown in FIG. 9B can be converted into a corrected shape as shown in FIG. 9C.

According to this example, the correction information includes a coefficient for calculation based on the detection result of the coordinates obtained when the intensity distribution of the position detection light L2 is regarded as a linear relationship, or a lookup table showing correspondence between the coordinates before and after the correction, for example.

Third Example of Error Correction Method

Figure 10A:
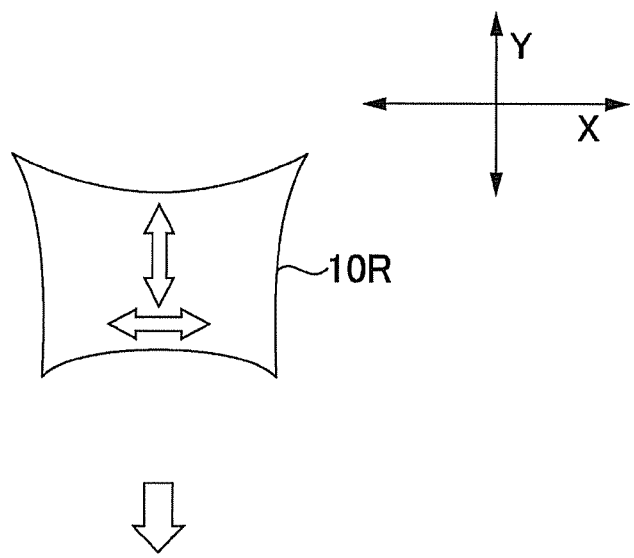
FIGS. 10A and 10B illustrate a third example of an error correction method performed by the projection type display system having the position detection function according to the embodiments of the invention.
Figure 10B:
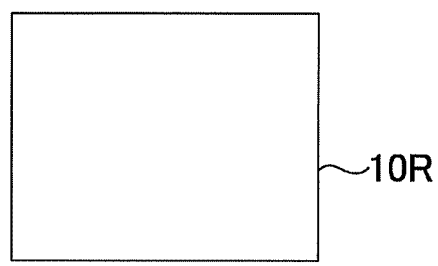

FIGS. 10A and 10B illustrate a third example of the error correction method performed by the projection type display system having the position detection function 100 according to the embodiments of the invention. In this example, the position determining unit 590 shown in FIG. 4A stores correction information in the memory section 591 as information for correcting the calculation result of the coordinates obtained when the intensity distribution of the position detection light L2 in the detection area 10R is regarded as a linear relationship similarly to the second example. Incase of determination of the X-Y coordinates of the target object Ob, the X coordinate and the Y coordinate of the target object Ob are determined based on the calculation result of the X coordinate and the Y coordinate obtained when the intensity distribution of the position detection light L2 in the detection area 10R is regarded as a linear relationship. Then, the X coordinate and the Y coordinate of the target object Ob are determined based on the calculated X coordinate and the Y coordinate and the correction information stored in the memory section 591. As a result, the shape of the detection area 10R distorted in both the X direction and the Y direction as illustrated in FIG. 10A can be corrected into a shape as illustrated in FIG. 10B.

According to this example, the correction information includes a coefficient for calculation based on the calculation result of the coordinates obtained when the intensity distribution of the position detection light L2 is regarded as a linear relationship, or a lookup table showing correspondence between the coordinates before and after the correction, for example.

Other Examples

While the first light detector 31 and the second light detector 32 are provided as the light detector 30 in the respective embodiments, only one light detector may be used in the first through third embodiments.

According to the embodiments, the X coordinate is calculated based on the difference or the ratio between the light reception result from the light detector 30 at the time when the first intensity distribution for X coordinate detection is produced and the light reception result from the light detector 30 at the time when the second intensity distribution for X coordinate detection is produced. However, the X coordinate may be calculated based on the difference or the ratio between the drive conditions required for driving the light emitting elements 12 such that the light reception result from the light detector 30 at the time when the first intensity distribution for X coordinate detection is produced can be equalized with the light reception result from the light detector 30 at the time when the second intensity distribution for X coordinate detection is produced. Also, the Y coordinate may be calculated based on the difference or the ratio between the drive conditions required for driving the light emitting elements 12 such that the light reception result from the light detector 30 at the time when the first intensity distribution for Y coordinate detection is produced can be equalized with the light reception result of the light detector 30 at the time when the second intensity distribution for Y coordinate detection is produced.

According to the embodiments, the position detection light source unit 11, the light detector 30, and the position detection unit 50 are all disposed on the image projection device 200. However, only the position detection light source unit 11 may be disposed on the image projection device 200, and the light detector 30 and the position detection unit 50 may be disposed at positions other than on the image projection device 200 such as the sides of the image projection device 200 and the sides of the detection area 10R.

The entire disclosure of Japanese Patent Application No. 2009-233069, filed Oct. 7, 2009 is expressly incorporated by reference herein.

What is claimed is:

1. A projection type display system having a position detection function which projects an image from an image projection device and optically detects a position of a target object between a surface on which the image is projected and the image projection device, comprising:
the image projection device;
a position detection light source unit disposed on the image projection device to emit position detection light toward a detection area in which the position of the target object is detected, the position detection light having intensity;
a light detector which detects reflection intensity of reflected position detection light reflected by the target object in the detection area that is defined by a first side and a second side opposite to the first side; and
a position detection unit which detects the position of the target object based on the reflection intensity detected by the light detector,
wherein an intensity distribution of the position detection light in the detection area is produced in a manner in which the intensity monotonously decreases from the first side to the second side during a first period and in which the intensity monotonously increases from the first side to the second side during a second period that is different from the first period, and
the light detector detects the reflection intensity of the reflected position detection light without detecting an image of the target object.

2. The projection type display system having the position detection function according to claim 1, wherein the position detection light is infrared light.

3. The projection type display system having the position detection function according to claim 1, wherein the intensity distribution of the position detection light in the detection area is produced in a manner in which the intensity linearly decreases or linearly increases from the first side to the second side.

4. The projection type display system having the position detection function according to claim 1, wherein the position detection light source unit emits the position detection light from a front surface of the image projection device where a projection lens for projecting the image is disposed.

5. The projection type display system having the position detection function according to claim 1, wherein the position detection light source unit, the light detector, and the position detection unit are all disposed on the image projection device.

6. The projection type display system having the position detection function according to claim 5, wherein the light detector is disposed on a front surface of the image projection device.

7. The projection type display system having the position detection function according to claim 1, wherein
when two directions crossing a projection direction of the image are an X axis direction and a Y axis direction, the position detection light source unit produces an X coordinate intensity distribution for X coordinate detection in which an X coordinate intensity of the position detection light changes in the X axis direction and a Y coordinate intensity distribution for Y coordinate detection in which a Y coordinate intensity of the position detection light changes in the Y axis direction.

8. The projection type display system having the position detection function according to claim 7, wherein
the X and Y coordinate intensity distributions have first and second X coordinate intensity distributions and first and second Y coordinate intensity distributions, respectively,
the first X coordinate intensity distribution is produced in a manner in which the intensity decreases from one side to the other side in the X axis direction, and the second X coordinate intensity distribution is produced in a manner in which the intensity increases from the one side to the other side in the X axis direction, and
the first Y coordinate intensity distribution is produced in a manner in which the intensity decreases from one side to the other side in the Y axis direction, and the second Y coordinate intensity distribution is produced in a manner in which the intensity increases from the one side to the other side in the Y axis direction.

9. The projection type display system having the position detection function according to claim 7, wherein
the position detection light source unit has a plurality of light emitting elements,
the plurality of light emitting elements and the light detector are provided at a front surface of the image projection device,
the X coordinate intensity distribution is produced in a manner in which the intensity monotonously decreases from an outside of the plurality of light emitting elements to an inside of the plurality of light emitting elements during a first period and in which the intensity monotonously increases from the outside of the plurality of light emitting elements to the inside of the plurality of light emitting elements during a second period that is different from the first period, and
the Y coordinate intensity distribution is produced in a manner in which the intensity monotonously decreases from an upper side of the plurality of light emitting elements to a lower side of the plurality of light emitting elements during a third period and in which the intensity monotonously increases from the upper side of the plurality of light emitting elements to the lower side of the plurality of light emitting elements during a fourth period that is different from the third period.

10. The projection type display system having the position detection function according to claim 7, further comprises
a memory that stores correction information that corrects a calculation result of coordinates obtained when each of the X and Y coordinate intensity distributions is regarded as a linear relationship, and
the position detection unit detects the position of the target object in the X and Y axis directions based on the correction information and the calculation result.

11. The projection type display system having the position detection function according to claim 1, further comprises
a memory that stores a function for determining a relationship between a position detection result of the position of the target object in the detection area obtained by the light detector and coordinate positions in the detection area, wherein
the position detection unit detects the position based on the function and the reflection intensity detected by the light detector.

12. A projection type display system having a position detection function which projects an image from an image projection device and optically detects a position of a target object between a surface on which the image is projected and the image projection device, comprising:
the image projection device;
a position detection light source unit disposed on the image projection device to emit position detection light toward a detection area in which the position of the target object is detected, the position detection light having intensity;
a light detector which detects reflection intensity of reflected position detection light reflected by the target object in the detection area that is defined by a first side and a second side opposite to the first side; and
a position detection unit which detects the position of the target object based on the reflection intensity detected by the light detector, wherein
an intensity distribution of the position detection light in the detection area is produced in a manner in which the intensity monotonously decreases or monotonously increases from the first side to the second side,
the position detection light source unit has a plurality of light emitting elements for emitting the position detection light, and the intensity distribution of the position detection light is formed by controlling balance of emission light amount of the plurality of light emitting elements, and
the light detector detects the reflection intensity of the reflected position detection light without detecting an image of the target object.

13. The projection type display system having the position detection function according to claim 12, wherein
when two directions crossing a projection direction of the image are X axis direction and Y axis direction, plural rows of the light emitting elements are disposed in both the X axis direction and the Y axis direction.

14. The projection type display system having the position detection function according to claim 12, wherein each of the light emitting elements has a wavelength peak in the same wavelength range.

15. The projection type display system having the position detection function according to claim 12, wherein
the plurality of light emitting elements have first light emitting elements for emitting first infrared light having a first wavelength peak in a first wavelength range, and second light emitting elements for emitting second infrared light having a second wavelength peak in a second wavelength range different from the first wavelength range, and the light detector has a first light detector having a first sensitivity peak in the first wavelength range and a second light detector having a second sensitivity peak in the second wavelength range.

16. The projection type display system having the position detection function according to claim 12, wherein
when all of the plurality of light emitting elements emit the position detection light with the same luminance, a Z coordinate intensity distribution in a light emitting Z axis direction of the position detection light in the detection area is produced in a manner in which the intensity monotonously decreases from a side of the image projection device is provided to a side of the surface on which the image is projected, and
the position detection unit detects the position in the light emitting Z axis direction of the target object based on the reflection intensity detected by the light detector.

17. The projection type display system having the position detection function according to claim 12, wherein
the intensity distribution of the position detection light in the detection area is produced in a manner in which the intensity linearly decreases or linearly increases from the first side to the second side.

18. The projection type display system having the position detection function according to claim 12, wherein
the position detection light source unit emits the position detection light from a front surface of the image projection device where a projection lens for projecting the image is disposed.

19. The projection type display system having the position detection function according to claim 12, wherein
the position detection light source unit, the light detector, and the position detection unit are all disposed on the image projection device.

20. The projection type display system having the position detection function according to claim 12, wherein
the intensity distribution of the position detection light in the detection area is produced in a manner in which the intensity monotonously decreases from the first side to the second side during a first period and in which the intensity monotonously increases from the first side to the second side during a second period that is different from the first period.

* * * * *